June 2, 1936.  T. B. FUNK  2,043,098

SPIDER FOR LAWN MOWER CUTTING REELS

Filed May 29, 1934

Inventor
Truman B. Funk
By Beaman & Langford
Attorney

Patented June 2, 1936

UNITED STATES PATENT OFFICE

2,043,098

SPIDER FOR LAWN MOWER CUTTING REELS

Truman B. Funk, Jackson, Mich., assignor to "Yard-Man" Inc., Jackson, Mich., a corporation of Michigan Application May 29, 1934, Serial No. 728,128

9 Claims. (Cl. 56—294)

This invention relates to lawn mower cutting reels and more particularly to sheet metal spiders for carrying the cutting blades.

Sheet metal spiders for cutting reels heretofore known generally have been unsatisfactory for the reason that no practical provision has been made for supporting the blades or for sharpening the blades after they have left the manufacturer. Constructions in which it has been attempted to overcome the above difficulties have invariably lacked sufficient backing up of the blades for reinforcing against strains tangential of the reel.

An object of this invention is to provide lawn mower cutting reel spiders of sheet metal having tangential reenforcing cutting blade portions.

Another object is to provide metal lawn mower cutting reel spiders cut back adjacent the cutting blades to permit resharpening in the field by grinding after the reel has left the manufacturer.

Still another object of this invention is to provide a sheet metal lawn mower cutting reel spider of simple construction adapted for the ready securing of cutting blades thereto.

Figure 1:
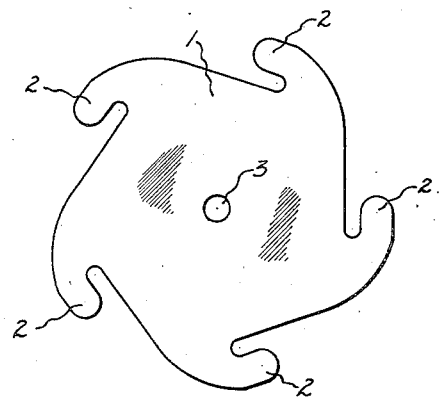
Figure 2:
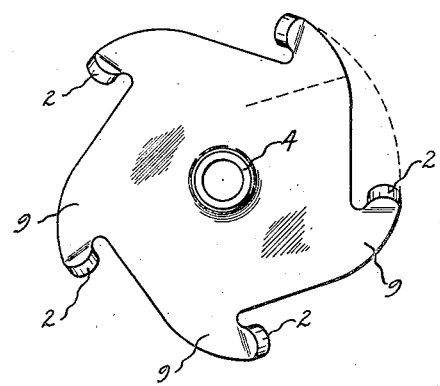
Figure 3:
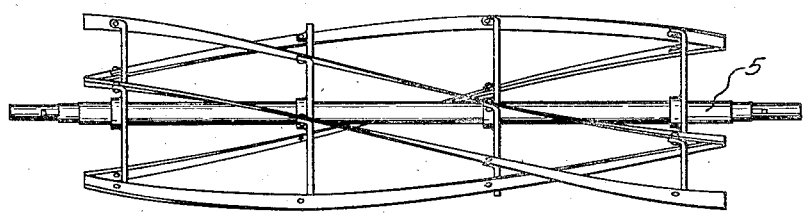
Figure 4:
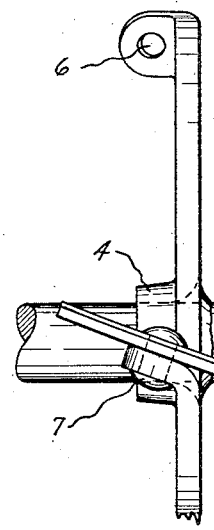
Figure 5:
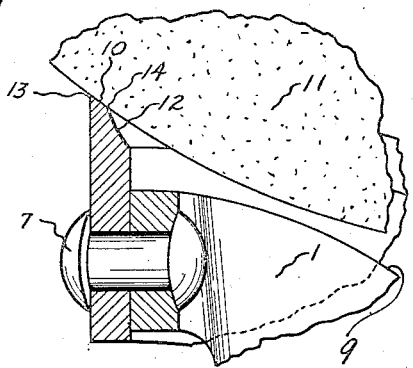

These and other objects will be apparent from the following specification when taken with the accompanying drawing in which Fig. 1 is an elevation of an initial stamping of a spider according to this invention, Fig. 2 is an elevation of a spider fully formed with the exception of drilling rivet holes for the securing of the cutting blades thereto, Fig. 3 is an elevation of a fully assembled cutting reel, Fig. 4 is a portion of the cutting reel showing, in detail, the method of securing a blade to the spider and the spider to its shaft, and Fig. 5 is a section showing a portion of the specific spider structure and its relation to the sharpening of the blade in the field after it has left the manufacturer.

Referring to the drawing, reference character 1 indicates the spider. The spider 1 is of die punched sheet metal and as originally blanked out is provided with tabs 2 in the plane thereof and a central hole 3 as shown in Fig. 1. After the spider has been blanked as shown in Fig. 1 the tabs 2 are bent outwardly, as shown particularly in Figs. 2 and 4, to blade receiving position and the portion of the spider surrounding the hole 3 is drawn into the hub 4 for carrying the reel shaft 5. In their blade receiving positions the tabs 2 extend in a radial direction. After the tabs 2 have been bent into blade receiving position they are drilled to provide rivet holes 6 for receiving rivets 7 by which the blades 8 are secured. The method of assembling the spiders 1, blades 8 and shaft 5 is not fully described herein for it does not comprise a part of this invention.

This invention relates particularly to the specific construction of the spider, the features of which are hereinafter described in detail and is an improvement over the construction disclosed in the patent to Worthington, No. 1,847,683. One feature of this invention is the shoulder 9 disposed behind each tab 2. During operation, the spider 1, as shown in Fig. 2, rotates in a counterclockwise direction. The shoulders 9 thus back up the blades 8 and receive the tangential thrust exerted by the blades 8 produced by their shearing action as they operate against the usual cutting bar in a manner well known in the art. Such reinforcement is of great importance for it prevents the springing of the reel during the exertion of an abnormal force by the blades as, for instance, when a stone or stick accidently gets between the cutting blade and the cutting bar.

Another feature of this invention resides in the particular shape of the shoulders 9. When the cutting blades are resharpened after they have left the manufacturer, due to the difficulty in mounting the blades for rotation and moving them against a rotating grinding wheel as is done in the factory, it is common practice in the field to resharpen blades by moving them against the outer face 10 of the grinding wheel 11 as shown in Fig. 5. This operation is known as backing off and comprises disposing the axis of the grinding wheel 11 out of radial alignment with the blade 8 in the direction of the beveled face 12 of the blade. A cut is then taken from the outer face 10 to present an upstanding shearing edge 13. The provision of the upstanding shearing edge 13 insures, in operation, a clean shearing action which will not be interfered with by the opposite edge 14 of the outer face 10 which would be the case were the axis of the grinding wheel 11 disposed in radial alignment with the blade 8.

The fact that the axis of the grinding wheel 11 is out of radial alignment with the blade 8 results in the periphery of the grinding wheel 11 extending into the zone of the shoulder 9 of the blade being sharpened. Interference by the grinding wheel 11 with the shoulder 9 is obviated by cutting back the shoulder 9 so that it is within the circumferential line through the outer edge of the tab 2 having the center of the hub 4 as its center. The outlines of the shoulders 9 adjacent their respective tabs 2 are preferably arcs having their respective centers on radial lines drawn between the center of the spider 1 and the outer edge of the respective tabs 2. The remaining outline of each shoulder 9 extends toward a point slightly below the tab adjacent the respective tab 2.

The spider produced according to this invention possesses advantages hitherto unknown in the art. The fact that it is die punched insures uniform accuracy and perfect alignment in the finished cutting reel. The sheet metallic construction having the outwardly bent, radially extending, blade receiving tabs together with the reinforcing backing for the tabs bearing the tangential thrust exerted by the blades provides a structure having great strength, extreme simplicity, lending itself to ease in assembling and of low cost, while at the same time providing for resharpening in the field, and sufficient reinforcement.

Having thus described my invention, what I desire to secure by Letters Patent and claim is as follows:

1. In a lawn mower cutting reel, a disc-like sheet metal spider having a plurality of integral radially extending blade supporting tabs disposed at the outer edge thereof and an integral reinforcing shoulder for each of said tabs, each shoulder being flat and extending in the plane of said spider from the outer edge of its respective tab toward a point below an adjacent tab within a circumferential line drawn through the outer edge of said tab having the center of said spider as its center.

2. A disc-like sheet metal cutting reel spider for lawn mowers comprising a plurality of radially extending blade supporting tabs disposed at the outer edge thereof and extending wholly to one side of the plane of said spider, and means reinforcing said tabs, said means comprising integral portions of said spider disposed within a circumferential line drawn through the outer edges of said tabs having the center of said spider as its center and extending from the outer edge of each of said respective tabs toward points slightly below adjacent tabs.

3. In a lawn mower cutting reel, a disc-like, sheet metal spider having a plurality of integral, radially extending blade supporting tabs disposed at the outer edge thereof and means backing up each of said tabs, each of said means comprising an integral portion of said spider disposed wholly in the plane thereof behind its respective tab and extending from the outer edge of said tab toward a point below an adjacent tab.

4. In a lawn mower cutting reel, a disc-like, sheet metal spider having a plurality of integral, radially extending blade supporting tabs disposed at the outer edge thereof, and a backing up shoulder for each of said tabs, each shoulder comprising a portion of said spider extending from directly behind its respective tab toward a point below an adjacent tab.

5. In a lawn mower cutting reel, a sheet metal spider having a central, disc-like portion, a plurality of radially extending arms extending in the plane of said disc-like portion, and an axially extending tab on each of said arms, said tabs projecting from the plane of said arms, the remainder of each arm being disposed directly behind its respective tab and comprising reinforcing backing therefor.

6. In a lawn mower cutting reel, a disc-like, sheet metal spider having a plurality of integral radially extending blade supporting tabs disposed at the outer edge thereof, said spider defining with an imaginary line connecting the outer edges of adjacent tabs, a substantially triangular open area defined by said spider and tabs in front of each of said tabs and means behind each of said tabs reinforcing the same.

7. In a lawn mower cutting reel, a disc-like sheet metal spider, a plurality of blade supporting tabs disposed at the outer edge thereof, and reinforcing means backing up said tabs directly behind the same, said reinforcing means partially defining a space for receiving a grinding wheel while being employed for backing off blades secured to said respective tabs.

8. In a lawn mower cutting reel, a disc-like sheet metal spider having a plurality of integral radially extending blade supporting tabs disposed at the outer edge thereof, and reinforcing means integral with said spider backing up said tabs directly behind the same, said reinforcing means partially defining a space for receiving a grinding wheel while being employed for backing off blades secured to said respective tabs.

9. In a lawn mower cutting reel, a disc-like, sheet metal spider having a plurality of integral, radially extending blade supporting tabs disposed at the outer edge thereof, and means reinforcing each of said tabs, each of said means comprising an integral portion of said spider disposed in the plane thereof behind its respective tab and extending from the outer edge of said tab to below an adjacent tab, said reinforcing means partially defining a space for receiving a grinding wheel while being employed for backing off blades secured to said respective tabs.

TRUMAN B. FUNK.